(12) United States Patent (10) Patent No.: US 8,757,543 B2
Wildman (45) Date of Patent: Jun. 24, 2014

(54) SUPPORT ASSEMBLY

(75) Inventor: Eric Wildman, Bristol (GB)

(73) Assignee: Airbus Operations Limited, Bristol (GB)

( * ) Notice: Subject to any disclaimer, the term of this patent is extended or adjusted under 35 U.S.C. 154(b) by 592 days.

(21) Appl. No.: 12/805,126

(22) Filed: Jul. 14, 2010

(65) Prior Publication Data

US 2011/0031351 A1 Feb. 10, 2011

(30) Foreign Application Priority Data

Aug. 4, 2009 (GB) .................................... 0913473.5

(51) Int. Cl.
*B64C 13/00* (2006.01)

(52) U.S. Cl.
USPC ........................................................ 244/99.3

(58) Field of Classification Search
USPC .................. 244/211–217, 88–89, 90 R, 99.3; 114/112, 204; 211/121, 162; 248/580
See application file for complete search history.

(56) References Cited

U.S. PATENT DOCUMENTS

| | | | |
|---|---|---|---|
| 2,906,569 A | | 9/1959 | Runton et al. |
| 4,248,486 A | | 2/1981 | Bradley et al. |
| 5,722,621 A | * | 3/1998 | Noble et al. ................ 244/215 |
| 2002/0067868 A1 | * | 6/2002 | Lyon et al. ...................... 384/43 |
| 2004/0065783 A1 | * | 4/2004 | Robinson ...................... 244/216 |
| 2011/0042525 A1 | * | 2/2011 | Parker .......................... 244/213 |

FOREIGN PATENT DOCUMENTS

| | | |
|---|---|---|
| EP | 0 205 939 | 5/1986 |
| GB | 2 048 181 | 4/1980 |
| WO | WO 98/23483 | 6/1998 |

OTHER PUBLICATIONS

Search Report for GB 0913473.5 dated Nov. 3, 2009.

* cited by examiner

*Primary Examiner* — Peter M Poon
*Assistant Examiner* — Timothy Schwarz
(74) *Attorney, Agent, or Firm* — Nixon & Vanderhye P.C.

(57) ABSTRACT

A support assembly for guiding a flap on an aircraft wing during deployment of the flap. The assembly includes an arcuate guide track mountable to an aircraft wing and defining a two-dimensional path, a carriage mounted on the guide track so as to slide along the track during flap deployment, a part-spherical bearing, and a shaft having one end attachable to a flap and the opposite end coupled to the carriage via said part-spherical bearing. The shaft is free to pivot relative to the carriage about a center of the part-spherical bearing in all directions, as the carriage slides along the track.

21 Claims, 2 Drawing Sheets

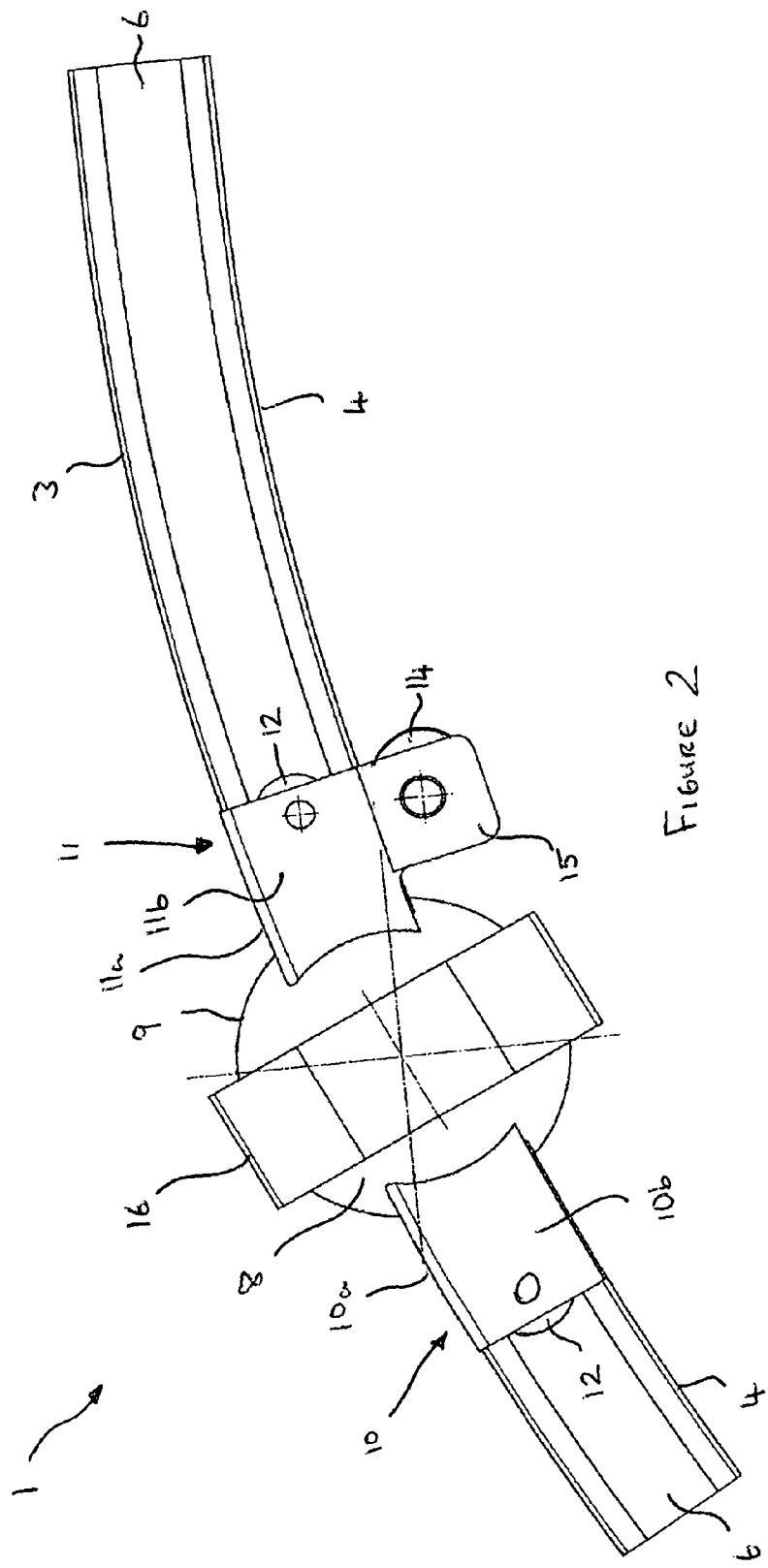

SUPPORT ASSEMBLY

This application claims priority to GB Patent Application No. 0913473.5 filed 4 Aug. 2009, the entire contents of which is hereby incorporated by reference.

FIELD OF THE INVENTION

The present invention relates to a support assembly for guiding a flap on the wing of aircraft during deployment of the flap from the wing. The assembly includes a bearing which is capable of guiding and supporting the flap throughout a wide range of movement in multiple directions.

BACKGROUND

A flap on an aircraft is attached to the wing at each end of the flap. A flap end support must allow for multiple degrees of freedom of movement of the flap whilst supporting the flap throughout that movement. The primary direction of movement of a flap during deployment and stowage may require it to follow an arcuate path. However, in addition to its primary direction of movement, secondary movements in other directions may also occur due to, for example, misalignments caused by wing bending which can induce axial changes in the length of the wing assembly, all of which must be accommodated for in the flap support.

In larger aircraft, the flaps may be required to follow a more unusual and constantly changing three-dimensional arc of movement during deployment so that they effectively extend widthwise (i.e. in a direction extending along the wing) in a direction which is essentially perpendicular to the direction of flow of air across the flap when fully deployed and so assume what is commonly known as a "streamwise" position. This is particularly the case with flaps that are located towards the outboard end of a wing away from the fuselage and which do not extend in a widthwise in a direction along the wing which is perpendicular to the direction of airflow when stowed, due to the tapering nature of the trailing edge of the wing to which they are mounted. This problem is less apparent with a flap located towards the inboard end of the wing closer to the fuselage as this flap may essentially extend in a widthwise direction along the wing and perpendicular to the direction of airflow over the wing when stowed. Therefore, it may be possible for the inboard flap to follow a two-dimensional path during deployment to maintain a streamwise position.

Traditionally, the conventional structure used to support the end of a flap consists of a complex track and carriage that employs a swinging arm assembly. Although this allows for multiple degrees of freedom of movement of the flap, it is complex because it requires a large number of parts. Its bulk also causes electrical system routing difficulties and increases weight.

The provision of a track which is shaped so as to enable a carriage travelling along the track to follow a path having directional components in three dimensions has been proposed. The track can be mounted either on the falsework rib within the wing structure or, to the end of the flap itself. Although this solution results in a reduction in the number of components, a track which is shaped so as to enable movement of a carriage following the track in three-dimensions is a complex and expensive structure to manufacture and accurate inspection to ensure that it has been accurately made to specified dimensions is difficult to achieve. It has also been found that the multi-roller bearings that follow a three-dimensional track are exposed to higher loads and are more prone to jamming and experience higher wear rates due to scuffing of the bearing against the surface of the track and/or skidding of the bearing across the track surface, especially when misalignment of the flap occurs due to unusual load patterns.

The provision of adequate failsafe features to ensure continued operation despite failure of any primary components has also been problematic in each of the proposals referred to above.

The present invention seeks to provide a support assembly that substantially overcomes or alleviates the problems and disadvantages described above and to offer considerable advantages over existing solutions in terms of reduced complexity, reduced physical size and weight.

SUMMARY OF THE INVENTION

According to the present invention, there is provided a support assembly for guiding a flap on an aircraft wing during deployment of the flap, the assembly comprising an arcuate guide track mountable to an aircraft wing and defining a two-dimensional path, a carriage mounted on the guide track so as to slide along the track during flap deployment, a part-spherical bearing and a shaft having one end attachable to a flap and the opposite end coupled to the carriage via said part-spherical bearing such that the shaft is free to pivot relative to the carriage about a centre of the part-spherical bearing in all directions, as the carriage slides along the track.

The support assembly of the invention accommodates all the required degrees of freedom that are invoked whilst deploying flaps on an aircraft, such as arc of travel, wing bending misalignments and unusual flap deployment methods that are required to achieve streamwise motion.

The part-spherical bearing preferably comprises a male bearing element having a part-spherical convex-shaped bearing seat.

Conveniently, the male bearing element forms part of the carriage or is configured to slide together with the carriage on the guide track.

Preferably, the male bearing element has an aperture therethrough and the guide track extends through said aperture when the carriage is mounted on the track.

In a preferred embodiment, carriage support members extend from the periphery of the aperture on opposite sides of the male bearing element, said support members extending at least partially around a portion of said guide track on either side of the male bearing element to support the male bearing element on the guide track.

The support members and male bearing element may together form the carriage slideably mountable on the guide track.

In one embodiment, the guide track includes a guide surface and the support members include guide elements that are configured to cooperate with the guide surface as the carriage slides along the track.

The guide track may have opposing recessed side walls and the support members have faces that extend over said side walls, the guide surface being formed in said recessed side walls with said guide elements mounted on said faces and located in the recess formed by said recessed side walls, when the carriage is on the guide track.

In one embodiment, the guide track has upper and lower surfaces separated by the recessed side walls, the faces of at least one of the support members having an extension that protrudes below the lower surface of the guide track, a second guide element being mounted to said extension that cooperates with a second guide surface formed on said lower face of the guide track.

The guide elements preferably comprise roller bearing elements rotatably mounted to said extensions and the guide surfaces comprise a bearing race along which said bearing elements can roll. In an alternative embodiment, the guide elements may be bushes or some other form of sliding element.

In a preferred embodiment, the guide track has first and second ends and means, at least one end of the guide track, to enable it to be mounted to an aircraft wing on bearings such that the guide track can move laterally, in a direction substantially at right-angles to the direction of movement of the carriage along the guide track, to allow for lateral movement of a flap supported by said assembly.

In a preferred embodiment, the part-spherical bearing comprises a female bearing element carried by the shaft, said female bearing element extending about, and cooperating with, the male bearing element.

Preferably, the female bearing element comprises a socket that extends around the male bearing element and has a part-spherical concave-shaped female bearing seat adapted to cooperate with the part-spherical convex-shaped male bearing seat of the male bearing element such that the socket can rotate about a centre point of the part-spherical bearing supported by said male bearing seat. The centre point is a theoretical centre of the bearing and is located somewhere in the centre of the guide track.

In a modified embodiment, the male and female bearing seats are spaced from each other and a roller bearing element is disposed in said space. The roller bearing element may comprise a plurality of spherical roller bearings rotatably received within a bearing cage, said spherical roller bearings being of a diameter substantially equal to the distance between the facing male and female bearing seats such that they contact both bearing seats and roll on both seats when the shaft rotates relative to the carriage.

In one embodiment, the female bearing seat comprises first and second bearing race portions that together form a bearing shell retained within said socket. In this embodiment, the female bearing seat may then comprise a pair of spaced circumferential grooves, the bearing race portions being received in a space between said grooves, said grooves being configured to receive a locking ring to retain the bearing race portions in position in the socket.

The shaft may be integral with and extend from the socket.

In another embodiment, a linear bearing element is mounted on the shaft to allow for relative movement between the end of the flap and the carriage in an axial direction along the length of the shaft, rather than mounting the guide track on bearings for lateral movement. The linear bearing element may be configured for attachment to a flap on an aircraft wing and the guide track is configured for attachment to a structural component of an aircraft wing.

According to another aspect of the invention, there is provided an aircraft wing having a flap supported by the support assembly according to the invention. The wing may have a structural rib and the guide track is then mounted to said rib, with the shaft being mounted to the flap.

BRIEF DESCRIPTION OF THE DRAWINGS

An embodiment of the present invention will now be described, by way of example only, and with reference to the accompanying drawings, in which:

FIG. 2 is a side view of the support assembly of FIG. 1.

DETAILED DESCRIPTION

Figure 1:
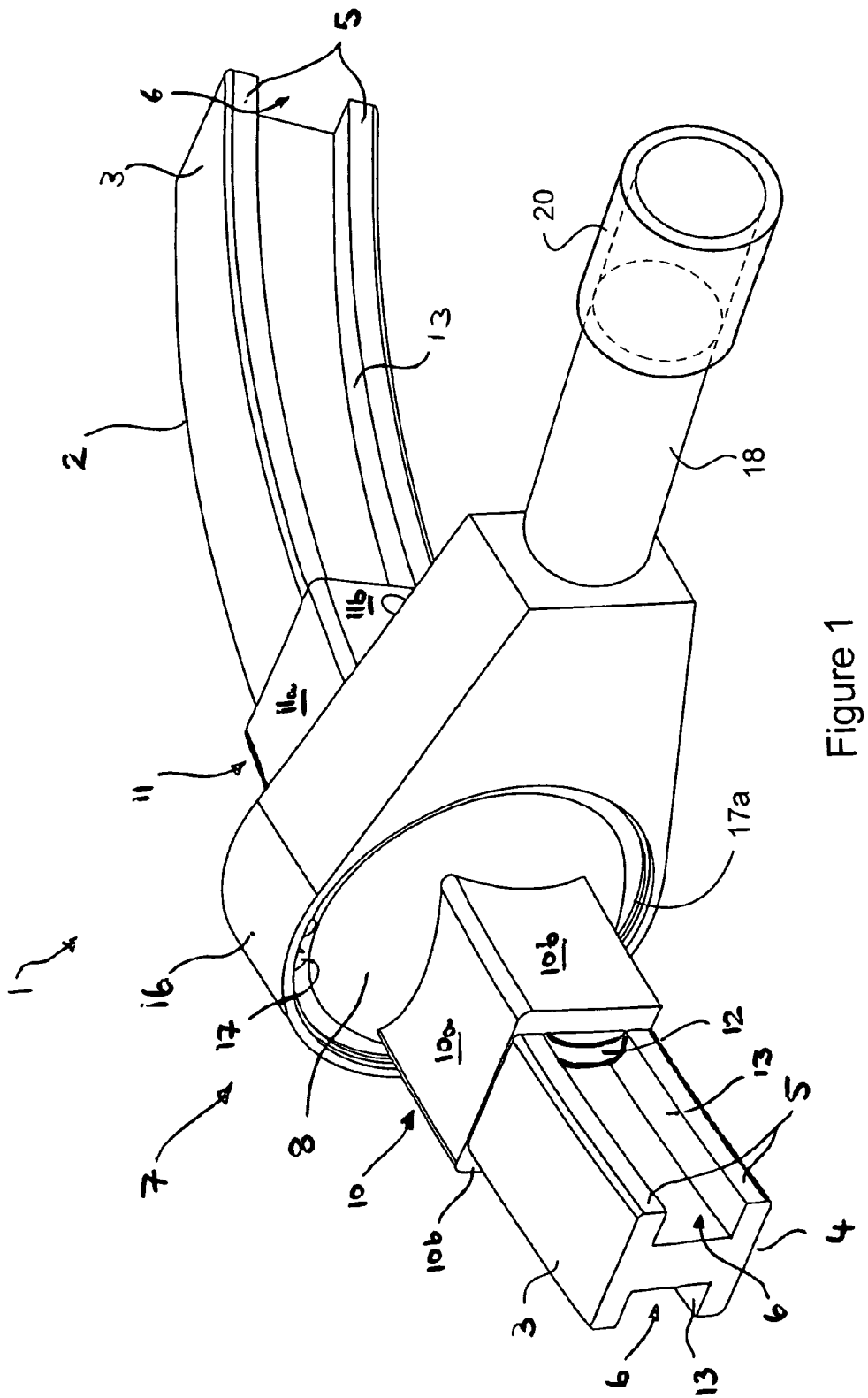
FIG. 1 is a perspective view of an embodiment of the support assembly of the invention comprising a guide track, a carriage located on the guide track that includes a part-spherical male bearing element and a female bearing element cooperating with the male bearing element, and a shaft extending from the socket.

Referring now to the drawings, there is shown in FIG. 1 a perspective view of a support assembly 1 for guiding the end of a flap (not shown) during deployment of the flap from an aircraft wing (not shown). The support assembly 1 comprises an arcuately shaped guide track 2 formed from an elongate beam or bar having a generally "I"-shaped cross-sectional profile with upper and lower curved faces 3, 4 separated by side walls 5. Each side wall 5 has a recess 6 formed therein such that the upper and lower curved faces 3,4 overhang the recess to form the cross-sectional "I" beam shape.

A carriage 7 is mounted on the guide track 2 which defines a two-dimensional arcuate path for the carriage 7 which can slide along the guide track 2. The guide track 2 is mounted to the fixed wing structure, such as the falsework rib of an aircraft wing. Although the guide track 2 may be immovably fixed to the wing, it is also possible to mount it on bearings such that it can move laterally as a whole to accommodate any lateral movements of the flap, i.e. mounted for movement in a direction substantially at right-angles to the direction of movement of the carriage 7 along the guide track 2. Alternatively, the track 2 can be mounted on a vertical hinge near to a spar of the wing to allow the track to swing, thereby accommodating any lateral flap movement. In a preferred embodiment, the flap is attached to a linear bearing mounted to the shaft to accommodate these movements, as explained in more detail below.

The carriage 7 comprises a part-spherical male bearing element 8 having a convex-shaped bearing seat 9 formed by its outer surface (see FIG. 2). The male bearing element 8 has an aperture extending therethrough to receive the guide track 2 extending therethrough such that the carriage 7 is slideably mounted on the guide track 2.

The carriage 7 also includes a support member 10, 11 extending from each side of the male bearing element 8 from around the periphery of the aperture. The support members 10, 11 each have an arcuate shape in a direction extending away from the male bearing element 8 and with a curve that corresponds to the curvature of the guide track 2 so that the carriage can slide along the guide track 2. Each of the support members 10, 11 have an upper face 10a,11a that lies parallel to the upper curved surface 3 of the guide track 2 and side faces 10b,11b that extend over the side walls 5 of the guide track 2 such that the support members 10,11 each have a generally upside down "U"-shaped cross-sectional profile with the guide track 2 received within it, as is apparent from FIG. 1.

A guide member 12 is rotatably mounted on the inside surface of each side face 10b,11b of the support members 10, 11 and are each received in corresponding recesses 6 in the side walls of the guide track 2. Only one guide member 12 is shown in FIG. 1, protruding from the end of one of the side faces 10b of support member 10, although two guide members 12 are shown in FIG. 2. However, it will be appreciated that the guide member 12 may be positioned entirely within the support member 10 to protect it from dirt and other contaminants and so will not protrude from the support members 10,11. An inner surface 13 of the walls of the recess 6 acts as a bearing race or guide to cooperate with the surface of the guide member so that the carriage 7 slides smoothly along the guide track 2.

As most clearly seen in FIG. 2, a portion 15 of at least one of the side faces 10b, 11b may extend downwardly below the lower surface of the guide track 2. A second guide member 14 may be rotatably mounted to this portion 15 of the side face 10b,11b and cooperate with the lower surface 4 of the guide track 2.

The guide members 2 may be roller bearing elements, bushes or slide members.

The male bearing element 8 is received in a female bearing element comprising a socket 16 in the form of a collar that extends around the male bearing element 8. The socket 16 has a part-spherical concave-shaped female bearing seat adapted to cooperate with the part-spherical convex-shaped male bearing seat 9 of the male bearing element 8. The female bearing seat is slideable over the male bearing seat and so rotates about a theoretical centre point of the part-spherical bearing supported by said male bearing seat 9. This bearing assembly allows unrestricted freedom of movement of the socket 16 in all dimensions about a centre of the bearing, that movement being limited only by a maximum angle at which point the socket 16 clashes with the support members 10, 11 extending from either side of the male bearing element.

Although the bearing can be a plain bearing, such as a lubrication free plain PTFE bearing, a roller element bearing is preferred due to the reduction of friction and wear. If a roller bearing element is used, the male and female bearing seats can be spaced from each other to enable a roller bearing element to be positioned between the male and female bearing surfaces. In one embodiment, the roller bearing element comprises a plurality of spherical roller bearings rotatably received within a bearing cage disposed in said space between the male and female bearing surfaces. The spherical roller bearings are of a diameter substantially equal, or slightly less than, the distance between the facing male and female bearing seats such that they contact both bearing seats and roll on both seats when the shaft rotates relative to the carriage.

The female bearing seat may be formed from first and second bearing race portions that together form a bearing shell that is retained within said socket by a locking ring 17, such as a circlip, that locates in a groove 17a formed in the socket 16.

A shaft 18 extends from the socket 16 and can be separately attached thereto or integrally formed together with the socket 16. The shaft 18 includes a plate (not shown) or other means at its free end remote from the socket 16 to enable it to be attached to a flap mounted to the aircraft wing.

A linear bearing element 20 can be mounted on a portion of the shaft 18 extending from the socket. The linear bearing element 20 is preferably a re-circulating ball linear bearing although it could also be a plain or some other type of rolling element bearing. The linear bearing element 20 allows relative movement between the shaft 18 and the flap in an axial direction along the length of the shaft 18 and so is intended to accommodate wing bending induced length changes in the wing assembly, as well as any misalignments. The axis of the linear bearing element 20 will be coaxial with the longitudinal axis of the shaft 18 and so extend through the theoretical centre of the part-spherical bearing.

The present invention is primarily intended for use in supporting the end of an outboard flap on the wing of a large sub-sonic passenger aircraft, although it is envisaged that it could also be used in other flap deployment systems or wing furniture movables including swing wing applications or even leading edge high lift devices or slats and "D" nose inboard or outboard end supports.

It will be appreciated that the foregoing description is given by way of example only and that modifications may be made to the support assembly of the present invention without departing from the scope of the appended claims.

The invention claimed is:

1. A support assembly for guiding a flap on an aircraft wing during deployment of the flap, the assembly comprising:
    an arcuate guide track mountable to an aircraft wing and defining a two-dimensional path;
    a carriage mounted on the guide track so as to slide along the track during flap deployment;
    a part-spherical bearing comprising a male bearing element and a female bearing element, said bearing elements moveable relative to each other, said male bearing element is received within said female bearing element; and
    a shaft having one end attachable to a flap and the opposite end coupled to the carriage via said part-spherical bearing such that the shaft is free to pivot relative to the carriage about a centre of the part-spherical bearing in all directions, as the carriage slides along the track, wherein said male bearing element comprises a part-spherical convex-shaped bearing seat located on the carriage and the female bearing element is located on the shaft and extends about and cooperates with the convex-shaped bearing seat.

2. A support assembly according to claim 1, wherein the male bearing element has an aperture therethrough and the guide track extends through said aperture when the carriage is mounted on the track.

3. A support assembly according to claim 2, wherein carriage support members extend from the periphery of the aperture on opposite sides of the male bearing element, said support members extending at least partially around a portion of said guide track on either side of the male bearing element to support the male bearing element on the guide track.

4. A support assembly according to claim 3, wherein the support members and male bearing element together form the carriage slideably mountable on the guide track.

5. A support assembly according to claim 3, wherein the guide track includes a guide surface and the support members include guide elements that are configured to cooperate with the guide surface as the carriage slides along the track.

6. A support assembly according to claim 5, wherein the guide track has opposing recessed side walls and the support members have faces that extend over said side walls, the guide surface being formed in said recessed side walls with said guide elements mounted on said faces and located in the recess formed by said recessed side walls, when the carriage is on the guide track.

7. A support assembly according to claim 6, wherein the guide track has a facing upper and lower surfaces separated by the recessed side walls, the faces of at least one of the support members having an extension that protrudes below the lower surface of the guide track, a second set of guide elements being mounted to said extensions that cooperate with a second guide surface formed on said lower face of the guide track.

8. A support assembly according to claim 5, wherein the guide track has opposing recessed side walls and the support members have faces that extend over said side walls, the guide elements comprise roller bearing elements rotatably mounted to said faces and the guide surfaces comprise a bearing race along which said bearing elements can roll.

9. A support assembly according to claim 1, wherein the female bearing element comprises a socket that extends partially around the male bearing element and has a part-spherical concave-shaped female bearing seat adapted to cooperate with the part-spherical convex-shaped male bearing seat of the male bearing element such that the socket can rotate about a theoretical centre point of the part-spherical bearing supported by said male bearing seat.

10. A support assembly according to claim 9, wherein the male and female bearing seats are spaced from each other and a roller bearing element is disposed in said space.

11. A support assembly according to claim 10, wherein the roller bearing element comprises a plurality of spherical roller bearings rotatably received within a bearing cage, said spherical roller bearings being of a diameter substantially equal to the distance between the facing male and female bearing seats such that they contact both bearing seats and roll on both seats when the shaft rotates relative to the carriage.

12. A support assembly according to claim 11, wherein the female bearing seat comprise first and second bearing race portions that together form a bearing shell retained within said socket.

13. A support assembly according to claim 12, wherein the female bearing seat comprises a pair of spaced circumferential grooves, the bearing race portions being received in a space between said grooves, said grooves being configured to receive a locking ring to retain the bearing race portions in position in the socket.

14. A support assembly according to claim 1, comprising a linear bearing element mounted on the shaft to allow for relative movement between the end of the flap and the carriage in an axial direction along the length of the shaft.

15. A support assembly according to claim 14, wherein the linear bearing element is configured for attachment to a flap on an aircraft wing and the guide track is configured for attachment to a structural component of an aircraft wing.

16. An aircraft wing having a flap supported by the support assembly according to claim 1, wherein the wing has a structural rib and the guide track is mounted to said rib, the shaft being mounted to the flap.

17. A support assembly for guiding a flap on an aircraft wing during deployment of the flap, the assembly comprising:
an arcuate guide track mountable to an aircraft wing and defining a two-dimensional path;
a carriage mounted on the guide track so as to slide along the track during flap deployment;
a part-spherical bearing; and
a shaft having one end attachable to a flap and the opposite end coupled to the carriage via said part-spherical bearing such that the shaft is free to pivot relative to the carriage about a centre of the part-spherical bearing in all directions, as the carriage slides along the track, wherein the part-spherical bearing comprises a male bearing element having a part-spherical convex-shaped bearing seat, wherein the part-spherical bearing comprises a female bearing element carried by the shaft, said female bearing element extending about, and cooperating with, the male bearing element, wherein the shaft is integral with and extends from the female bearing element.

18. A support assembly for guiding a flap on an aircraft wing during deployment of the flap, the assembly comprising:
an arcuate guide track mountable to an aircraft wing and defining a two-dimensional path;
a carriage mounted on the guide track so as to slide along the track during flap deployment;
a part-spherical bearing; and
a shaft having one end attachable to a flap and the opposite end coupled to the carriage via said part-spherical bearing such that the shaft is free to pivot relative to the carriage about a centre of the part-spherical bearing in all directions, as the carriage slides along the track, wherein the part-spherical bearing comprises a male bearing element having a part-spherical convex-shaped bearing seat, wherein the male bearing element forms part of the carriage or is configured to slide together with the carriage on the guide track, wherein the male bearing element has an aperture therethrough and the guide track extends through said aperture when the carriage is mounted on the track.

19. A support assembly according to claim 18, wherein carriage support members extend from the periphery of the aperture on opposite sides of the male bearing element, said support members extending at least partially around a portion of said guide track on either side of the male bearing element to support the male bearing element on the guide track.

20. A support assembly according to claim 19, wherein the support members and male bearing element together form the carriage slideably mountable on the guide track.

21. A support assembly according to claim 19, wherein the guide track includes a guide surface and the support members include guide elements that are configured to cooperate with the guide surface as the carriage slides along the track.

* * * * *